Nov. 5, 1946.  P. GLASS  2,410,651

ELECTRIC CONTROL SYSTEM

Filed Feb. 17, 1943  2 Sheets-Sheet 1

Inventor
PAUL GLASS

By Ralph B. Stewart
Attorney

Nov. 5, 1946.  P. GLASS  2,410,651
ELECTRIC CONTROL SYSTEM
Filed Feb. 17, 1943  2 Sheets-Sheet 2

Inventor
PAUL GLASS
By Ralph B. Stewart
Attorney

Patented Nov. 5, 1946

2,410,651

UNITED STATES PATENT OFFICE 2,410,651

ELECTRIC CONTROL SYSTEM

Paul Glass, Chicago, Ill., assignor to Askania Regulator Company, a corporation of Illinois Application February 17, 1943, Serial No. 476,222

7 Claims. (Cl. 172—239)

This invention relates to electric systems for the control of a motor driven element.

An object of the invention is to devise an electric system for controlling the position of a motor driven element in accordance with one or more variable factors.

In all forms of my invention I employ a balanced network in the form of a Wheatstone bridge having four arms connected in the usual bridge arrangement. At least one of the arms is varied in accordance with a variable factor which is to control the movement of the motor driven element, and the resultant current which flows (or the resultant voltage) in the null circuit of the bridge operates suitable control apparatus to energize the motor in the proper direction to move the motor driven element and to simultaneously rebalance the bridge.

My invention is useful in many fields of application. One obvious use of the invention is that the motor driven element may be employed as an indicator to indicate the variation in a variable factor which tends to unbalance the bridge, or the combined effect of two or more variable factors which tend to unbalance the bridge. In its use as an indicator, the invention may be employed as a calculating device to perform certain mathematical operations. A further obvious use of the invention is that the motor driven element may be employed to exercise a control on other apparatus or systems, the control varying in a predetermined manner in accordance with one or more variable factors tending to unbalance the bridge. Under the broad heading of control may be included the function of regulation, that is, the motor driven element may be employed to control the condition or variable factor which tends to unbalance the bridge and thereby maintain the condition or factor at a predetermined constant value.

Another advantage of my invention is that all forms of the control system may be employed for remote operation of the motor driven element. In other words, the control element or elements and the motor driven element need not be in the same location.

The Wheatstone bridge may be formed entirely of variable resistance elements, and in this case, one object of my invention is to devise an arrangement wherein the bridge will function to measure small values of variable factors without the danger of short-circuiting the source of current connected to the bridge.

The systems employing bridges having variable resistance elements are especially useful for repeating mechanical movements, either rectilinear or rotary, by varying the resistance of one or more arms of the bridge by sliding contacts on the resistors. The resistance bridge is also useful for measuring, indicating or controlling in accordance with any physical condition which may be employed to vary the resistance of one or more arms of the bridge. For example, one or more arms of the bridge may be formed of heat sensitive resistances which vary in accordance with temperature of a medium, a light sensitive resistance, a resistance which varies in accordance with concentrations of solutions, or in accordance with any other physical condition.

One or more of the arms of the Wheatstone bridge may be formed of elements in which electro-motive forces are generated in accordance with the condition or factor which is to exercise control over the motor driven element. Examples of suitable devices are a thermo-couple which is responsive to temperature variations, a photo-electric cell responsive to light conditions, and a pilot generator responsive to the speed of a rotary element. Other examples will be obvious to those skilled in the art.

A number of modifications of my invention are illustrated in the accompanying drawings in which Figure 1 is a diagrammatic view of one form of the invention providing proportional movement between the driven element and a control element, and including an adjustable element for varying the ratio between the two movements;

Figure 1:
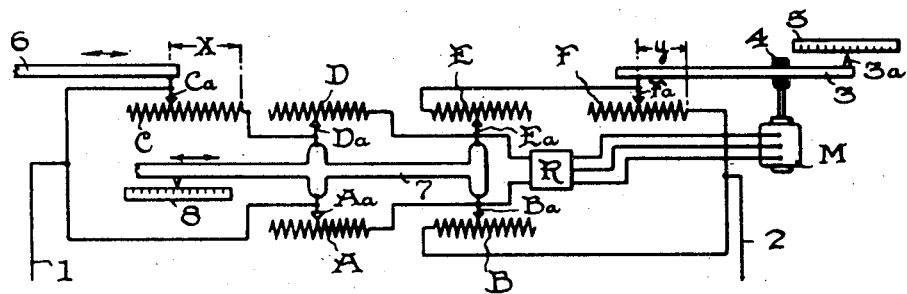

Referring to Figure 1, six variable resistance elements A, B, C, D, E and F are connected as a Wheatstone bridge between two supply conductors 1 and 2 leading to a suitable source of current, either D. C. or A. C. Resistances A and B are connected in series in one path between conductors 1 and 2, while resistances C, D, E and F are connected in series in a parallel path between conductors 1 and 2. One terminal of the null circuit of the bridge is connected to one path at a point between resistances A and B, and the other terminal of the null circuit is connected to the other path between resistances D and E. As shown in the drawings, the null circuit is connected to control a suitable relay or control apparatus R which in turn controls a reversible motor M of any suitable construction. I prefer to employ an electric motor, but other forms of motors may be used such as mechanical, hydraulic, pneumatic and the like. Various forms of apparatus are known suitable for use at R and M and the details of this apparatus need not be described herein.

Motor M is arranged to drive a receiver or driven element 3 which in Figure 1 is shown as a bar mounted for rectilinear movement and arranged to shift the contact Fa of resistance F. Any suitable driving mechanism may be employed, and for the purpose of illustration I have shown a pinion 4 mounted on the motor shaft and positioned to engage a rack carried by the bar 3. In addition to moving contact Fa, bar 3 may be connected to exercise a control over any other apparatus. A graduated scale 5 may be arranged parallel with bar 3, and the position of the bar may be indicated on the scale 5 by means of a pointer 3a carried by the bar.

A movable element such as bar 6 is arranged to operate movable contact Ca on resistance C. Bar 6 may be manually controlled, or it may be actuated by any device which responds to a physical condition or any desired factor. Contacts Aa, Ba, Da and Ea are all mounted upon a movable element 7 for simultaneous movement, and element 7 may be adjusted by hand or automatically in response to any desired factor or condition. Resistances A and B are connected in circuit in a manner such that movement of the variable contacts does not change the total amount of resistance in the circuit, and the same is true of the connection for resistances D and E.

In Figure 1 it will be seen that in one parallel branch of the bridge, resistances C and D form one arm of the bridge on one side of the null circuit, while resistances E and F form the other arm of the bridge on the opposite side of the null circuit. In the second parallel branch of the bridge, resistance A forms one arm of the bridge on the same side of the null circuit as the arm C—D; while resistance B forms the other arm of the bridge on the same side of the null circuit as arm E—F.

With the bridge in balance, the following relation exists between the resistance values in the various arms:

$$\frac{C+D}{E+F}=\frac{A}{B} \qquad (1)$$

In Figure 1 the simultaneous movement of the contacts on resistances A, B, D and E maintains the relation $$\frac{D}{E}=\frac{A}{B} \qquad (2)$$

By combining (1) and (2) there results $$F=\frac{B}{A}\times C \qquad (3)$$

Where the various resistance elements have the same resistance per unit length, Equation 3 may be written $$Y=\frac{B}{A}\times X \qquad (4)$$

where X represents the distance of movement of control member 6 over resistance C and Y represents the distance of movement of the motor driven element 3 with respect to resistance F. Accordingly, the displacement of the driven element 3 or the receiver is equal to the displacement X of the transmitter 6 multiplied by the factor $$\frac{B}{A}$$

Where A and B are equal, elements 3 and 6 will have equal movements. By shifting the member 7 either to the right or left, element 3 may be made to have a greater or smaller range of movement than the element 6. It will be understood that when transmitter 6 is shifted in position, the bridge is unbalanced, and the current flow (or voltage) in the null circuit operates control apparatus R to drive motor M in the proper direction to rebalance the bridge by movement of the receiver 3 to include a greater or smaller part of resistance F in the bridge arm. The movement of receiver 3 will always be proportional to the movement of transmitter 6, but the range of movement of receiver 3 may be varied by changing the position of control element 7.

Figure 2:
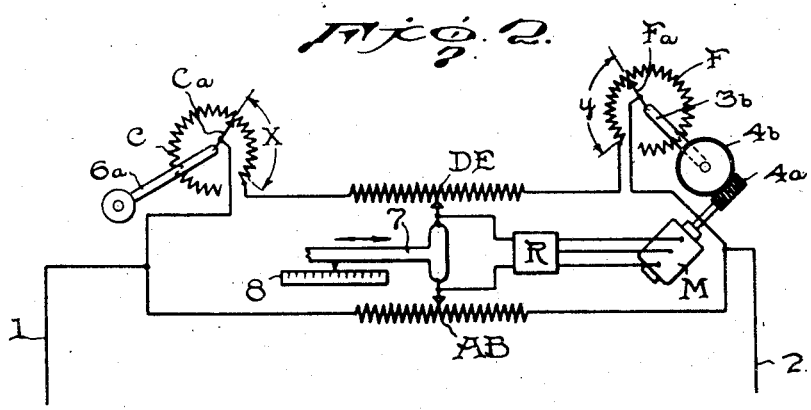
Figure 2 is a simplified form of the arrangement shown in Figure 1, but involving rotary movement of the control element and the motor driven element.

In Figure 2 I have shown an arrangement in which resistances A and B of Figure 1 have been combined into a single resistance AB and resistances D and E have been combined into a single resistance D—E, each provided with a single movable contact and the two contacts being movable simultaneously by element 7. Also, instead of using transmitter having rectilinear movement, a rotary transmitter may be employed such as the rotary shaft 6a for controlling the angular position of contact arm Ca on resistance C which is arranged in a circular path. In a like manner, the receiver involves a rotary element such as shaft 3b driven from motor M by any suitable gearing such as the worm 4a meshing with worm gear 4b. Shaft 3b varies the angular position of rotary contact arm Fa on resistance F. If desired the rotary contact arm Fa may be mounted directly on the shaft of motor M.

The operation of Figure 2 is essentially the same as the operation of Figure 1 except that the transmitter and receiver elements have a rotary movement instead of rectilinear movement. By shifting control member 7, it is possible to change the angular range of movement of the receiver 3b for any given angular range of movement of the transmitter 6a while still maintaining proportional movement of the receiver with respect to the transmitter. In both Figures 1 and 2 a suitable scale 8 may be arranged adjacent control member 7 to indicate the ratio of movement which will be obtained for any given position of the member 7.

Figure 3:
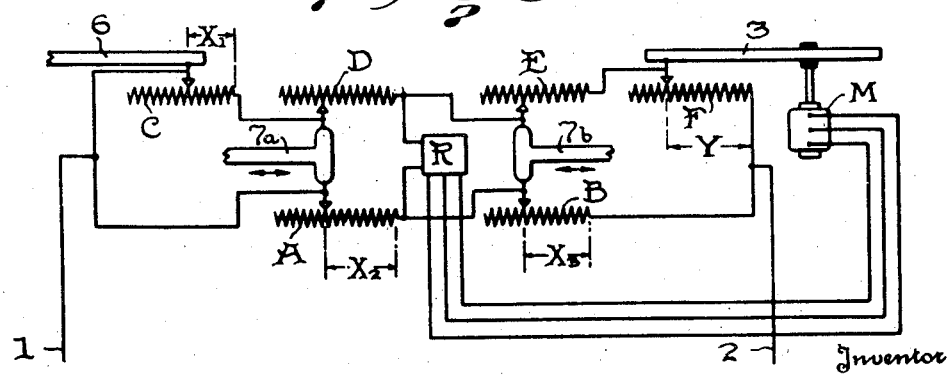
Figure 3 is a diagram showing a second form of the invention wherein the position of the driven element may be controlled in accordance with variations in three variables, the position of the driven element being determined by the product of two of the variables divided by the third variable.

Figure 3 is the same as Figure 1 except that the movable contacts on resistances A and D are mounted for simultaneous movement by a movable element 7a, while the variable contacts on resistances B and E are mounted for simultaneous movement by a second control element 7b. In this arrangement all three movable elements 6, 7a and 7b may be referred to as transmitter elements and may be controlled either manually or automatically in accordance with any desired factor or function. The movement of receiver 3 is controlled by all three transmitters, and the arrangement is such that the receiver is moved in proportion to the product of the movements of transmitters 6 and 7b divided by the movement of transmitter 7a. In other words, $$Y = \frac{X1 X3}{X2}$$

It will be understood that any one of the transmitter elements may be set in fixed position while the other two are varied, and in this way the arrangement is capable of performing a variety of operations.

Figure 4:
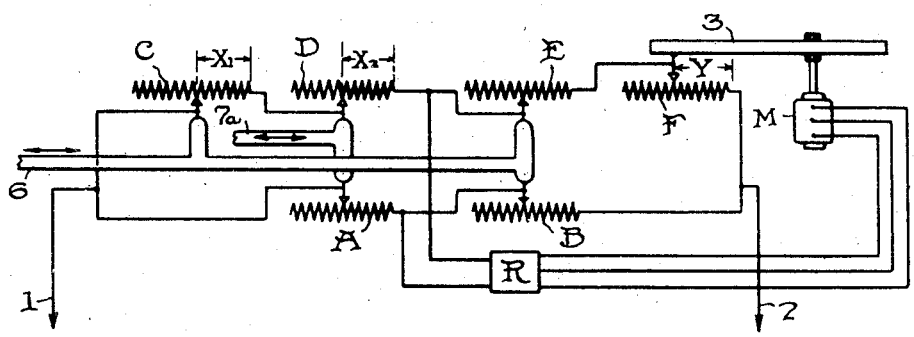
Figure 4 is a diagram showing one form of control system in which the movement of the driven element is controlled in accordance with the square of one variable, or in accordance with the square of one variable divided by a second variable.

In Figure 4 transmitter 6 is arranged to control the variable contact on resistance C and also on resistances B and E on the opposite side of the null circuit, while the two contacts on resistances A and D are controlled by a second transmitter element 7a. In this arrangement the movement of receiver 3 will be proportional to the square of the movement of transmitter 6 divided by the movement of transmitter 7a if B is always equal to C. Where 7a remains fixed, receiver 3 moves in proportion to the square of the movement of transmitter 6. The equation for Figure 4 is $$Y = \frac{X1^2}{X2}$$

Figure 5:
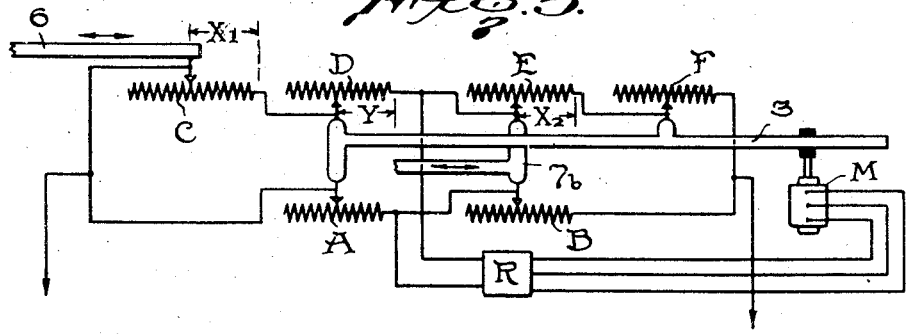
Figure 5 is a diagram of a control system in which the driven element is controlled in accordance with the square root of either one of two variables, or in accordance with the product of the square root of the two variables.

In Figure 5 transmitter 6 controls resistance C as in Figure 1, and transmitter 7b controls resistances B and E as in Figure 3, while resistances A and D are controlled simultaneously with resistance F by receiver 3. In this arrangement, movement of receiver 3 will be proportional to the product of the square roots of the movements of transmitters 6 and 7b if A is always equal to F. The equation for Figure 5 is $$Y = \sqrt{X1}\sqrt{X2}$$

In each of Figures 2 to 5, inclusive, the simultaneous movement of contacts A and D, or of contacts B and E, maintains the relation expressed by Equation 2 above.

It is obvious that the transmitter and receiver elements in any of the foregoing figures may have either rotary or rectilinear movement. It is also obvious that the bridge need not be formed of resistance elements but may be formed of reactive elements such as inductances or capacitances or a combination of reactive elements and resistive elements.

It is also obvious that the receiver element may be controlled in accordance with the sum or difference of two or more signals or factors by controlling a corresponding number of variable resistance elements in one arm of the bridge.

Figure 6:
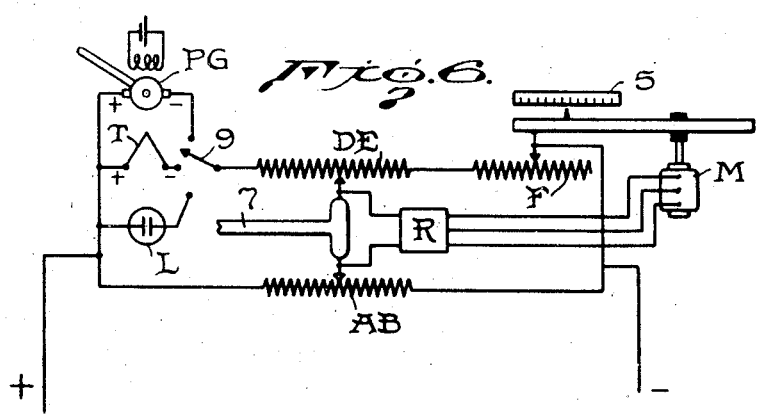
Figure 6 is a diagram showing a control circuit like Figure 2 and illustrating various forms of control devices which may be employed in the circuit.

In Figure 6 I have shown other forms of control devices which may be employed in my control system instead of resistance elements with sliding contacts. For example, instead of resistance C a thermo-couple T may be connected in the bridge circuit through switch element 9, and the thermo-couple will introduce in one arm of the bridge a potential which varies in accordance with the medium surrounding the thermo-couple. With this arrangement, scale 5 associated with receiver 3 may be graduated to indicate temperature.

Another form of transmitter is shown by the separately excited pilot generator PG which is driven from some device which varies in speed. With this form of transmitter, the voltage introduced into the bridge circuit will vary in accordance with the speed of the device under test, and scale 5 may be graduated in terms of speed.

The transmitter represented at L in Figure 6 may assume the form of two electrodes placed in a liquid the conductivity of which is to be investigated, and in this case the scale 5 may be graduated in terms which indicate the conductivity of the liquid under test.

Where a voltage generating element is used as the control element, proportional response is not obtained throughout the entire range of operation where the condition of Equation 2 is maintained, but substantially proportional response is obtained over a limited range of operation covering the lower values of voltage.

It will be understood that any of the various forms of transmitters shown in Figure 6 may be used in connection with the other figures, and other forms of transmitters will be obvious to those skilled in the art. Where voltage generating types of transmitters are substituted for variable resistances A and D in Figures 3 and 4 (or for resistances B and E in Figures 3 and 5) the two transmitters must be arranged to be responsive to the same conditions. For example, if two thermo-couples are substituted for these variable resistances, they should be placed in the same temperature environment so as to vary simultaneously and by equal amounts.

In the appended claims, where there is a reference to a device or means responsive to "current" in the null circuit, this term is to be interpreted broadly to include voltage responsive devices or means. Also, the term "means for varying an electrical condition" of an arm of the bridge is to be interpreted to apply to means for varying a physical characteristic of an element in the arm, such as a variable resistance, reactance and the like, or to an element which introduces a variable electrical effect into the arm, such as the various forms of transmitting elements shown in Figure 6.

What I claim is:

1. An electric control system comprising a Wheatstone bridge having two parallel paths connected to a supply circuit and a null circuit bridged across said paths, control means for varying the electrical condition of one arm of said bridge to unbalance the same, a receiver for varying the electrical condition of another arm of said bridge on the opposite side of said null circuit from said first arm, means included in said null circuit and being responsive to the current therein for controlling said receiver to rebalance said bridge, and second control means for simultaneously varying in the same direction the electrical conditions of two arms in separate paths of said bridge.

2. A control system according to claim 1 wherein said second control means varies the electrical condition of two arms on the same side of said null circuit.

3. A control system according to claim 1 wherein said second control means varies the electrical condition of two arms of said bridge on one side of said null circuit and simultaneously varies in an opposite sense the electrical condition of the two arms on the opposite side of said null circuit.

4. An electric control system comprising a Wheatstone bridge having two parallel paths connected to a supply circuit and a null circuit bridged across said paths, a movable transmitter element for varying the electrical condition of one arm of said bridge to unbalance the same, a movable receiver element for varying the electrical condition of another arm of said bridge on the opposite side of said null circuit from said first arm, means included in said null circuit and being responsive to the current therein for operating said receiver element to rebalance said bridge, and means operated by one of said movable elements for simultaneously varying the electrical condition of the two arms of said bridge on the opposite side of said null circuit from the arm which is varied by said movable element.

5. A control system according to claim 4 wherein said movable transmitter element simultaneously varies three arms of said bridge and varies by equal amounts two arms situated on opposite sides of said null circuit and in different paths.

6. A control system according to claim 4 wherein said movable receiver element simultaneously varies three arms of said bridge and varies by equal amounts two arms situated on opposite sides of said null circuit and in different paths.

7. A control system according to claim 1 wherein said second control means simultaneously varies in the same direction the electrical condition of two arms of the bridge on the same side of said null circuit, and including a third control means for simultaneously varying in the same direction the electrical condition of the two arms of said bridge on the opposite side of said null circuit, all of said control means operating independently of each other.

PAUL GLASS.